United States Patent [19]

Iijima

[11] Patent Number: 4,887,234
[45] Date of Patent: Dec. 12, 1989

[54] PORTABLE ELECTRONIC DEVICE WITH PLURAL MEMORY AREAS

[75] Inventor: Yasuo Iijima, Yokohama, Japan

[73] Assignee: Kabushiki Kaisha Toshiba, Kawasaki, Japan

[21] Appl. No.: 298,261

[22] Filed: Jan. 13, 1989

Related U.S. Application Data

[63] Continuation of Ser. No. 919,243, Oct. 15, 1986, abandoned.

[30] Foreign Application Priority Data

Nov. 30, 1985 [JP] Japan ................................ 60-269626
Nov. 30, 1985 [JP] Japan ................................ 60-269630
Jan. 7, 1986 [JP] Japan ..................................... 61-213

[51] Int. Cl.$^4$ ......................... G06F 12/16; G06K 5/00
[52] U.S. Cl. .................................... 364/900; 235/380; 235/492; 364/954.2; 364/965.76
[58] Field of Search ............... 235/380, 492, 439, 435, 235/375, 382.5; 364/200, 900

[56] References Cited

U.S. PATENT DOCUMENTS

| 3,601,809 | 8/1971 | Gray et al. ........................... 364/200 |
| 3,601,810 | 8/1971 | Anderson et al. .................... 364/200 |
| 3,601,812 | 8/1971 | Weisbecker ......................... 364/200 |
| 3,971,916 | 7/1976 | Moreno ............................... 364/200 |
| 4,001,550 | 1/1977 | Schatz . |
| 4,056,848 | 11/1977 | Gilley ................................. 364/900 |
| 4,092,524 | 5/1978 | Moreno ............................... 235/487 |
| 4,102,493 | 7/1978 | Moreno ............................... 235/419 |
| 4,402,057 | 8/1983 | Hou et al. ........................... 364/900 |
| 4,432,170 | 3/1984 | Moschitz et al. ................... 364/900 |
| 4,456,976 | 6/1984 | Savage ............................... 364/900 |
| 4,614,861 | 9/1986 | Pavlov et al. ....................... 235/381 |
| 4,625,276 | 11/1986 | Benton et al. ...................... 235/380 |
| 4,628,359 | 12/1986 | Okada et al. ....................... 358/122 |
| 4,797,543 | 1/1989 | Watanabe ........................... 235/492 |
| 4,829,169 | 5/1989 | Watanabe ........................... 235/380 |

FOREIGN PATENT DOCUMENTS

| 0061373 | 2/1983 | European Pat. Off. . |
| 0159539 | 10/1985 | European Pat. Off. . |
| 2738113 | 9/1978 | Fed. Rep. of Germany . |
| 2837201 | 1/1979 | Fed. Rep. of Germany . |
| PCT/US87/-00912 | 11/1987 | PCT Int'l Appl. . |

Primary Examiner—Gareth D. Shaw
Assistant Examiner—Debra A. Chun
Attorney, Agent, or Firm—Cushman, Darby & Cushman

[57] ABSTRACT

A portable electronic device in which storage data supplied from an external device is stored in a deletable EEPROM or in a non-deletable EPROM in accordance with specified data added to the storage data and an indication of whether or not the storage data is deletable. When a plurality of areas in the EEPROM are to be accessed, data access is performed as if a single area were accessed. The number of bytes or bits as a processing unit is determined for each of the plurality of areas, and when data is written therein, attribute data is added for each processing unit. Specified data is stored together with data for discriminating the specified data, written upon use by a user, into alterable data, non-alterable data, deletable data, and non-deletable data. The alterable or deletable specified data can be altered or deleted when an alteration or deletion instruction is input and a coincidence is found between specified personal identification numbers.

6 Claims, 21 Drawing Sheets

| AREA NUMBER | NUMBER OF BYTES | START ADDRESS | FINAL ADDRESS |
|---|---|---|---|
| 01 | 5 | aaa | bbb |
| 02 | 4 | ccc | ddd |
| 03 | 4 | eee | fff |
|  |  |  |  |
| FE | 5 | ggg | hhh |
| FF | 3 | iii | jjj |

FIG. 24

| ALTERING INSTRUC- TION CODE | AREA DATA | ALTERATION DATA |
|---|---|---|

FIG. 25A

| ALTERING INSTRUC- TION CODE | 00 | X |
|---|---|---|

FIG. 25B

| ALTERING INSTRUC- TION CODE | 02 | Y |
|---|---|---|

FIG. 26

| 1XXXXXXX | 00 | X |
|---|---|---|
| 0XXXXXXX | 01 | B |
| 0XXXXXXX | 02 | C |
| 1XXXXXXX | 03 | D |
| ⋮ | ⋮ | ⋮ |

| PIN PREPARATORY STORAGE FUNCTION CODE | PIN PREPARATORY NUMBER |
|---|---|

FIG. 30

| PIN STORAGE FUNCTION CODE | PIN |
|---|---|

|  | AREA DATA | ACCESS DATA | MEMORY ADDRESS |
|---|---|---|---|
| 00 | 00 | 00XXXXXX | 000 |
|  | 01 | 00XXXXXX | aaa |
|  | 02 | 10XXXXXX | bbb |
|  | 03 | 11XXXXXX | ccc |
|  | FF | 11XXXXXX | yyy |
| 01 | | | |
| 02 | | | |
| 03 | | | |
| FF | | | |

4a

F I G. 33
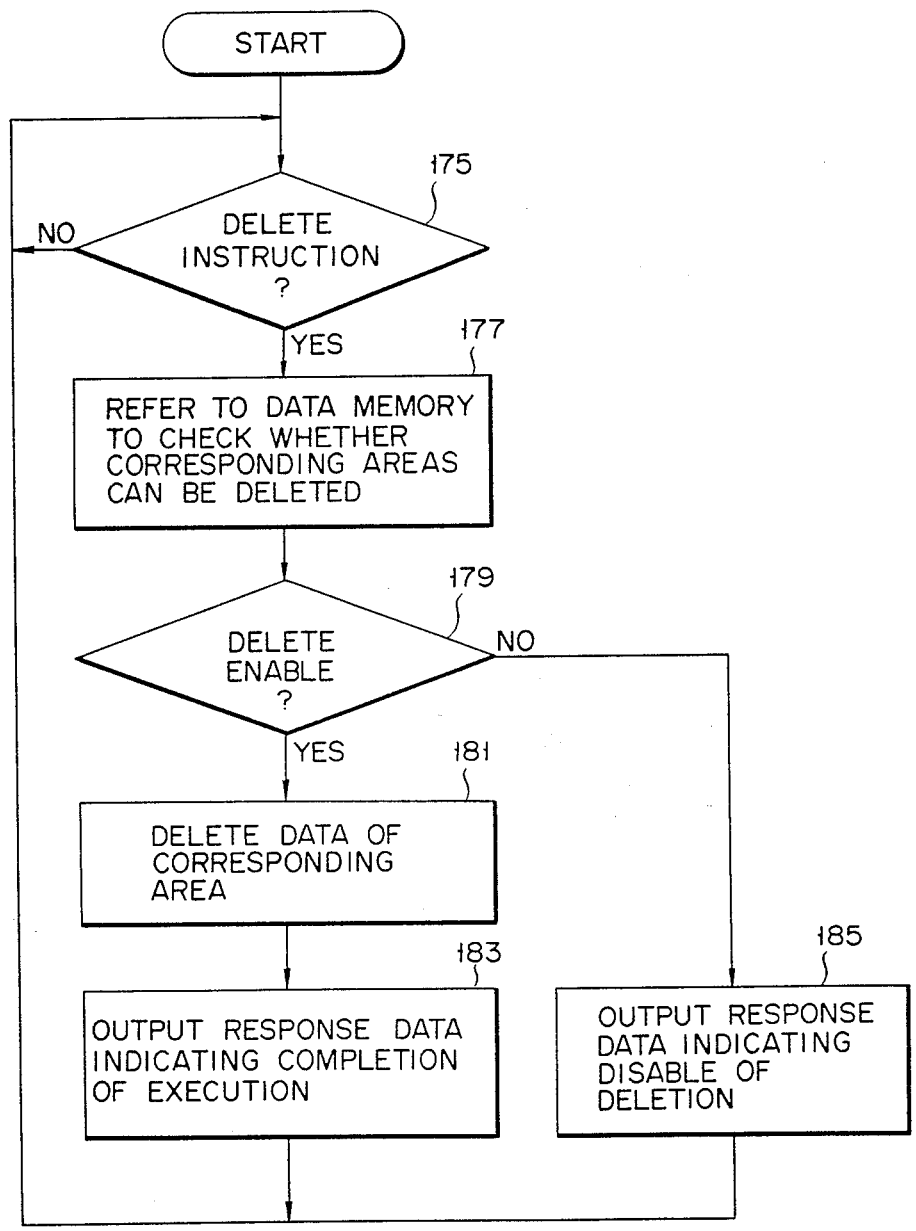

PORTABLE ELECTRONIC DEVICE WITH PLURAL MEMORY AREAS

This is a continuation of application Ser. No. 919,243 filed Oct. 15, 1986 which was abandoned upon the filing hereof.

BACKGROUND OF THE INVENTION

The present invention relates to a portable electronic device, such as a so-called IC card, incorporating an IC (integrated circuit) chip having, e.g., a nonvolatile memory and a control element, e.g., a CPU and the like.

In recent years, an IC card incorporating a nonvolatile data memory (e.g., a PROM), a CPU and the like has been developed as a memory card for storing data, and is commercially available. In a system using an IC card of this type, data communication with the IC card is performed using a card reader/writer. When instruction data with a function code is input from the card reader/writer, the IC card executes a function and outputs the result to the card reader/writer as response data.

The IC card may also incorporate an EPROM as a memory. In such a case, data once stored in the card cannot be deleted externally. In this case, therefore, the IC card has a drawback that unnecessary data cannot be deleted.

The latest IC card of the prior art incorporates an EEPROM, and storage data in such a memory can be electrically deleted. However, even the data to be held permanently may be deleted.

In such IC cards, data indicating a memory area as an access target of input data is included in control data in the input data. For this reason, when a plurality of memory areas are to be accessed, data must be input to individual memory areas taking all these memory areas into consideration. Such an access method is inefficient. In addition, since the format of the internal memory areas can be externally recognized, this results in lack of security of the data of the IC card.

Also, when a data string input to such IC cards is written in a data memory, the data string is stored as a block, and the following access is performed by recognizing the block. In a conventional storage method, an arbitrary data string is stored in units of blocks. With this method, when the data string is stored, it is stored with attribute data for indicating an attribute of the block. The attribute data consists of an identifier indicating, e.g., whether data constituting the block is valid or invalid. With this method, the attribute of a block consisting of a large amount of data is indicated only by single attribute data. In this case, when this large amount of data is stored, if part of the data cannot be normally stored for some reason, the abnormally stored data must be made invalid or deleted so as not to interfere with the following data access. However, if such a large amount of data is made invalid, the data area which can be used for the following write operation may be reduced.

When the IC card is used in a field where security is of prime importance, a personal identification number is stored as personal identification data. When the personal identification number is stored, it is input using, e.g., a keyboard of a terminal device and is then sent to and stored in the IC card through the card reader/writer. However, in the conventional IC card, once the personal identification number is stored, it can no longer be updated. For this reason, if the personal identification number of the IC card is known to a third party, since it cannot be updated, the third party who knows the number can utilize it. Therefore, the security of the IC card system may be lost.

If the valid date of the IC card corresponds to its service life, valid date data is also stored therein. However, once the valid date data is stored, it also cannot be updated. For this reason, the service life of the IC card cannot be updated, thus preventing effective use of the IC card.

As a data format of the prior art IC cards, a memory region is divided into a plurality of areas, and data management is generally performed in accordance with data access conditions for each area. The data access conditions include data associated with a data delete operation. When data in a given area is deleted, data indicating whether or not the area can be deleted is referred to. Only when it is determined that the area can be deleted is the data deleted. However, the data content includes specified data, such as personal identification data, which must not be deleted. Thus, if data indicating whether or not an area can be deleted can be rewritten, data which must not be deleted may also be erroneously deleted.

SUMMARY OF THE INVENTION

It is an object of the present invention to provide a portable electronic device which can delete unnecessary data and can prevent data to be permanently held from being deleted.

It is another object of the present invention to provide a portable electronic device in which the format of an internal memory area cannot be recognized externally, and which can thereby improve security.

It is still another object of the present invention to provide a portable electronic device in which attribute data added to data can be easily searched, and when a large amount of data is written, if a write error occurs, a normal storage state can be recovered by rewriting part of the data so that the memory area can be effectively used.

It is still another object of the present invention to provide a portable electronic device in which specified data, e.g., a personal identification number, valid date data, and the like, stored in a data memory can be updated or altered as needed.

It is still another object of the present invention to provide a portable electronic device in which when data in a data memory is controlled in units of areas, data which must not be deleted can be protected from being erroneously deleted.

In order to achieve the above objects, there is provided a portable electronic device comprising:

first memory means in which data stored therein is deletable;

second memory means in which data stored therein is non-deletable;

judging means for, in response to specified data supplied from an external device and consisting of data to be stored, attribute data indicating an attribute of the data to be stored and address data indicating an address at which the data is to be stored, checking the attribute data to judge if the data to be stored is permanent storage data or temporal storage data; and memory storage means for selectively storing the data to be stored in the first and second memory means in accordance with the judging result of the judging means.

BRIEF DESCRIPTION OF THE DRAWINGS

Other objects and features of the present invention will be apparent from the following description taken in connection with the accompanying drawings, in which:

FIG. 24 is a format of altering instruction data;

FIGS. 25A and 25B are detailed formats of altering instruction data;

FIG. 26 is a representation showing a storage state in a data memory after specified data is altered;

FIG. 29 is an example of a format of PIN preparatory storage instruction;

FIG. 30 is an example of a format of PIN preparatory storage instruction data;

FIG. 33 is a flow chart for explaining the operation of the fifth embodiment.

DETAILED DESCRIPTION OF THE PREFERRED EMBODIMENTS

A first embodiment of the present invention will be described hereinafter with reference to FIGS. 1 through 11.

Figure 1:
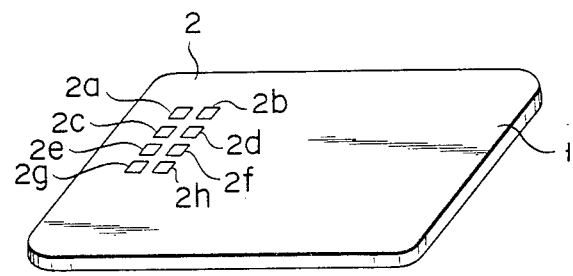
FIG. 1 is a perspective view showing the outer appearance of an IC card according to an embodiment of the present invention.

Referring to FIG. 1, reference numeral 1 denotes an IC card as a portable medium. Connector section 2 is arranged on the surface of IC card 1, and is constituted by, e.g., a plurality of terminals 2a through 2h. Terminal 2a is used for an operating power supply voltage (+5 V) terminal; 2b, a ground terminal; 2c, a clock signal terminal; 2d, a reset signal terminal; 2e through 2g, data input/output terminals; and 2h, a write power supply voltage (+21 V) terminal.

Figure 2:
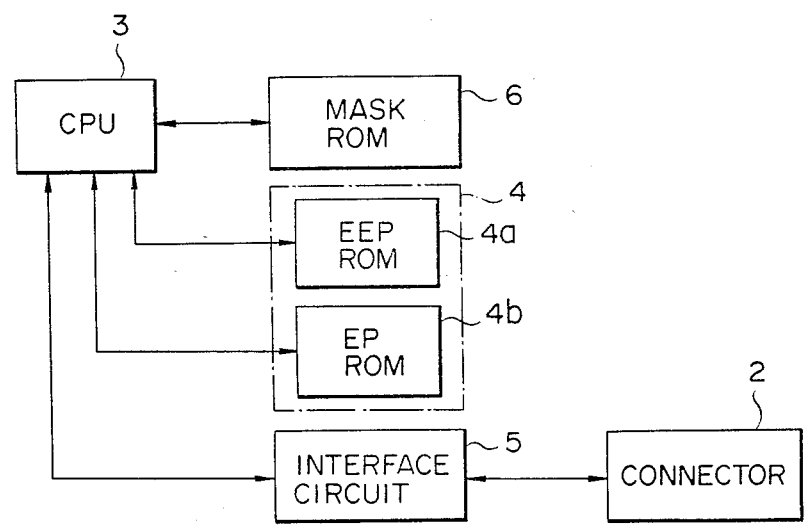
FIG. 2 is an example of a schematic block diagram of an electronic circuit of the IC card shown in FIG. 1.

IC card 1 incorporates control CPU (Central Processing Unit) 3, data memory 4 for storing a PIN (Personal Identification Number), data, and the like, interface circuit 5, and mask ROM 6 for storing various control programs, as shown in FIG. 2. The respective components are constituted by IC chips and are arranged on a single substrate. Interface circuit 5 is connected to connecter section 2 through wiring.

Figure 3:
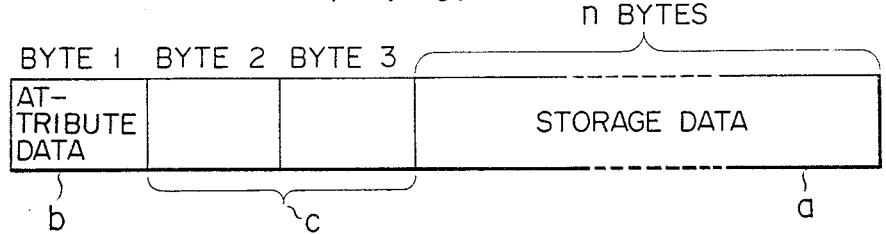
FIG. 3 is an example of a format of input data.
Figure 4:
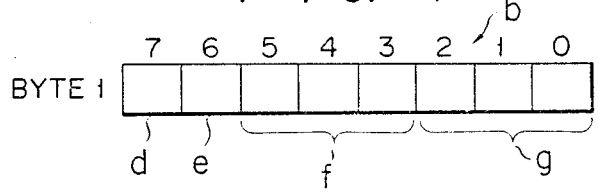
FIG. 4 is a format of attribute data shown in FIG. 3.

Data memory 4 comprises deletable EEPROM (Electrically Erasable Programmable Read Only Memory) 4a for temporarily storing data, and non-deletable EPROM (Electrically Programmable Read Only Memory) 4b for permanently storing data. In accordance with input data supplied from an external device, i.e., storage data and specified data added thereto, CPU 3 stores the storage data in EEPROM 4a or EPROM 4b. As shown in FIG. 3, the input data is constituted by n-byte storage data a, and specified data consisting of 1-byte attribute data b indicating an attribute of data, and 2-byte address data c indicating a storage area. Attribute data b consists of 1-bit area d for storing a flag indicating whether corresponding data is permanently stored data (non-deletable) or temporarily stored data (deletable), 1-bit area e for storing a flag indicating the presence/absence of permanent storage possiblity (a special area for temporal storage), 3-bit area f for storing altering specified conditions, and 3-bit area g for storing erasing specified conditions, as shown in FIG. 4.

Figure 5:
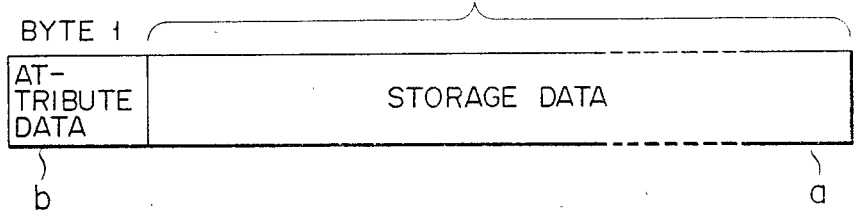
FIG. 5 is a format of storage data shown in FIG. 3.

Storage data (n bytes) is stored in EEPROM 4a together with attribute data, i.e., data indicating whether or not the corresponding data can be altered to be permanently stored data (the presence/absence of permanent storage possibility), as shown in FIG. 5.

Figure 6:
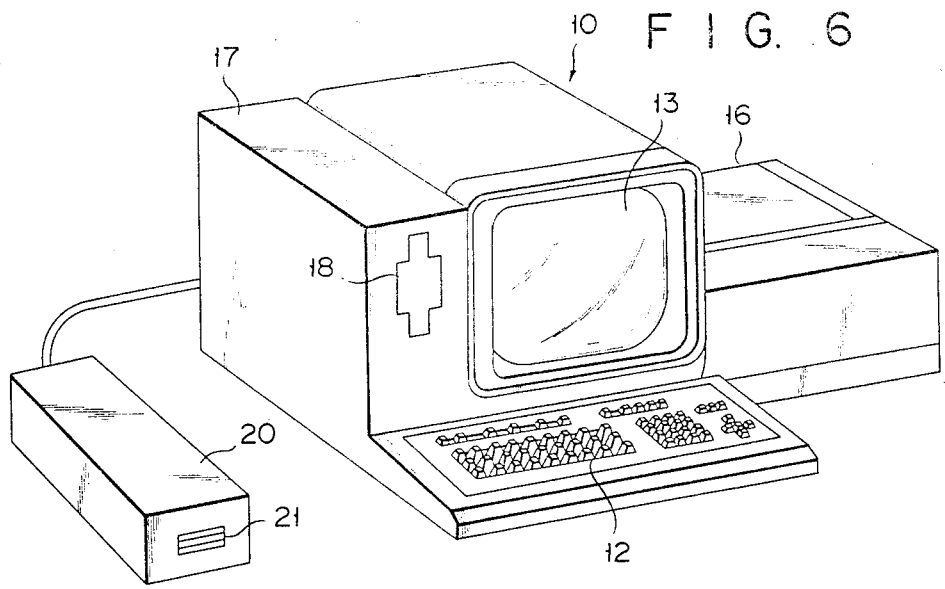
FIG. 6 is a perspective view of a card manipulator (host system) connected to a portable electronic device of the present invention.
Figure 7:
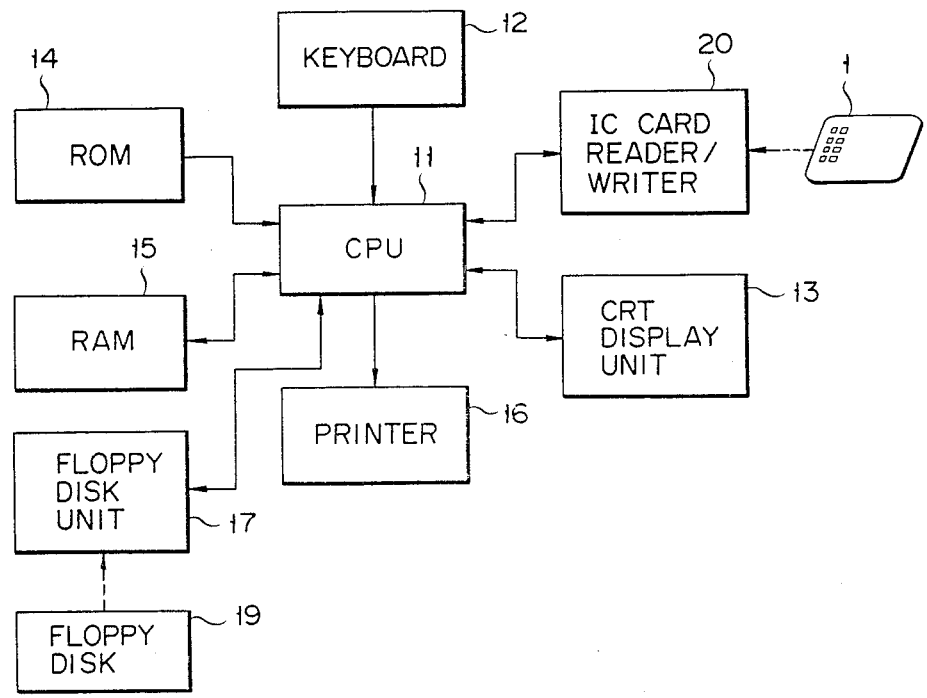
FIG. 7 is an example of a block diagram of the arrangement of the card manipulator shown in FIG. 6.

FIGS. 6 and 7 show the arrangement of IC card manipulator 10 as a terminal device according to the present invention. Reference numeral 11 denotes a CPU (Central Processing Unit) for controlling the entire device; 12, a keyboard for inputting data; 13, a CRT display unit; 14, a ROM (Read-Only Memory) for storing control programs; 15, a RAM (Random Access Memory) for storing data; 16, a dot printer for outputting various print data; 17, a floppy disk unit which stores or reproduces data in or from floppy disk 19 inserted from floppy disk insertion port 18; and 20, an IC card reader/writer section for reading or writing data from or in a memory.

Figure 8:
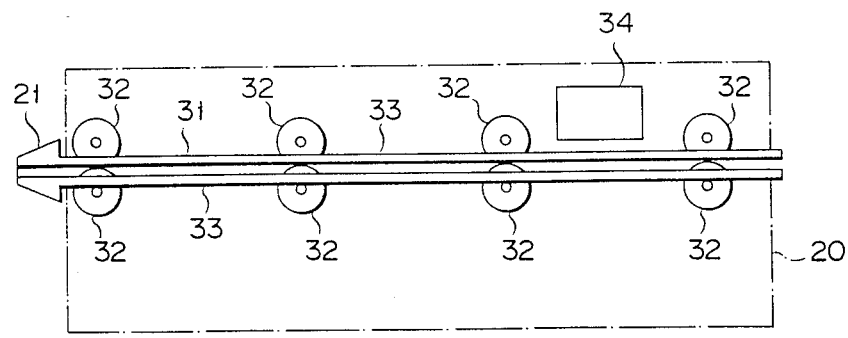
FIG. 8 is an example of a sectional view of an IC card reader/writer shown in FIG. 7.

IC card reader/writer section 20 is connected to card manipulator 10 through cable 22. More specifically, as shown in FIG. 8, section 20 has convey path 31 for conveying IC card 1 inserted from card insertion port 21. A plurality of pairs of convey rollers 32 are arranged along path 31 to vertically sandwich IC card 1 when it is conveyed. The pairs of convey rollers 32 are provided at equal intervals along path 31. A distance from the center of each convey roller 32 to the center of an adjacent convey roller 32 corresponds to a width of card 1 in the convey direction. Therefore, path 31 for IC card 1 is defined by convey guide 33. Reader/writer 34 for performing data communication with CPU 3 of card 1 is arranged above guide 33. Reader/writer 34 is electrically connected to connector section 2.

Figure 9:
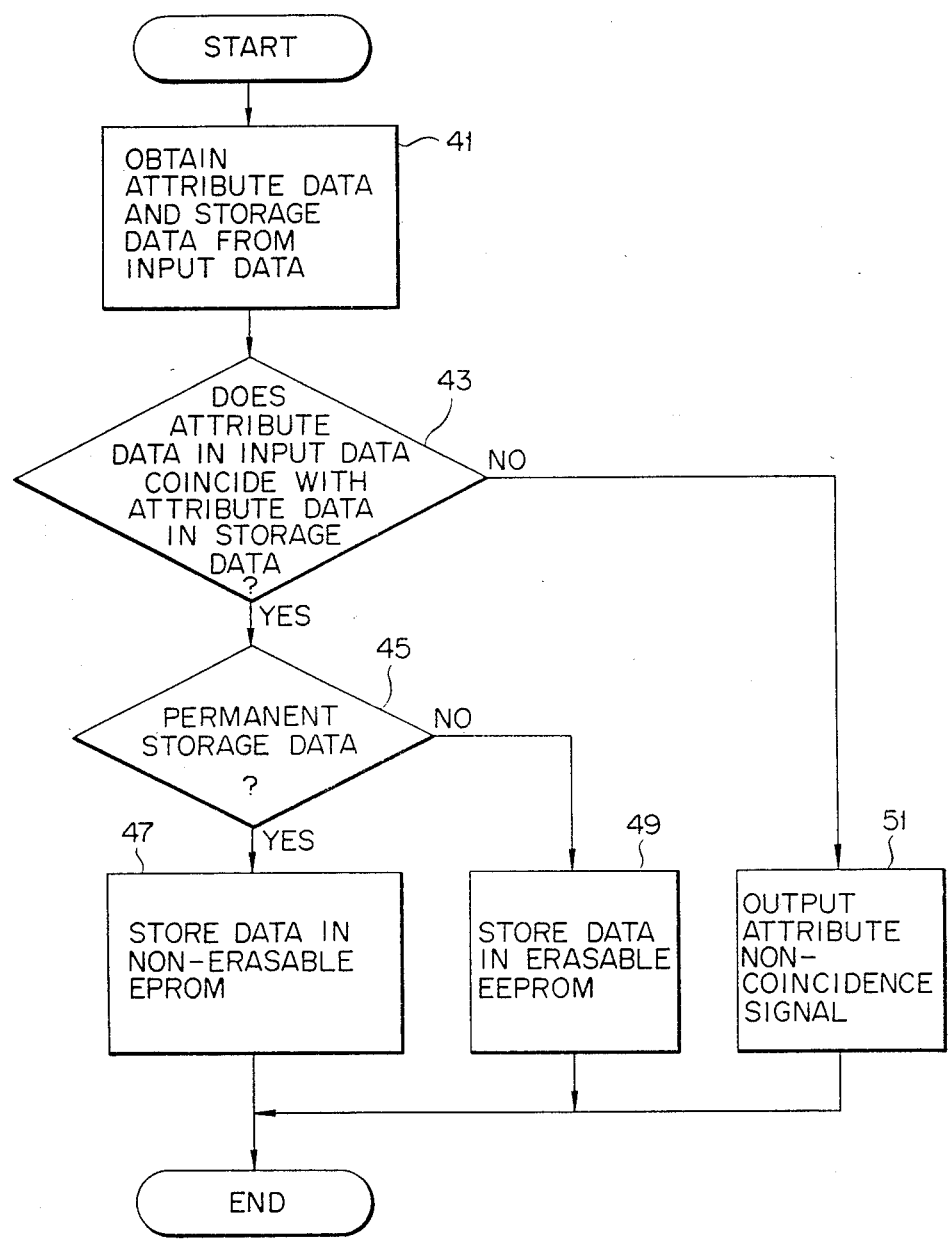
FIG. 9 is a flow chart for explaining the operation when data is stored in the portable electronic device of the present invention.

The operation of IC card 1 together with the above arrangement will be described with reference to the flow chart of FIG. 9. Assume that input data shown in FIG. 3 is supplied from CPU 11 of manipulator 10 to CPU 3 (step 41). CPU 3 determines whether the input data is permanent storage data or temporal storage data, in accordance with whether the flag is set in area d in attribute data b. It is then checked in step 43, from the determination result and in accordance with whether a data memory specified by address data c is EEPROM 4a or EPROM 4b, if the attribute data coincides with a memory for storage. If a coincidence is found, data consisting of storage data a and attribute data b in the input data is stored in EEPROM 4a or EPROM 4b specified by address data c (steps 45, 47, and 49). However, if no coincidence is found, CPU 3 supplies an attribute non-coincidence signal to CPU 11 (step 51).

Figure 10:
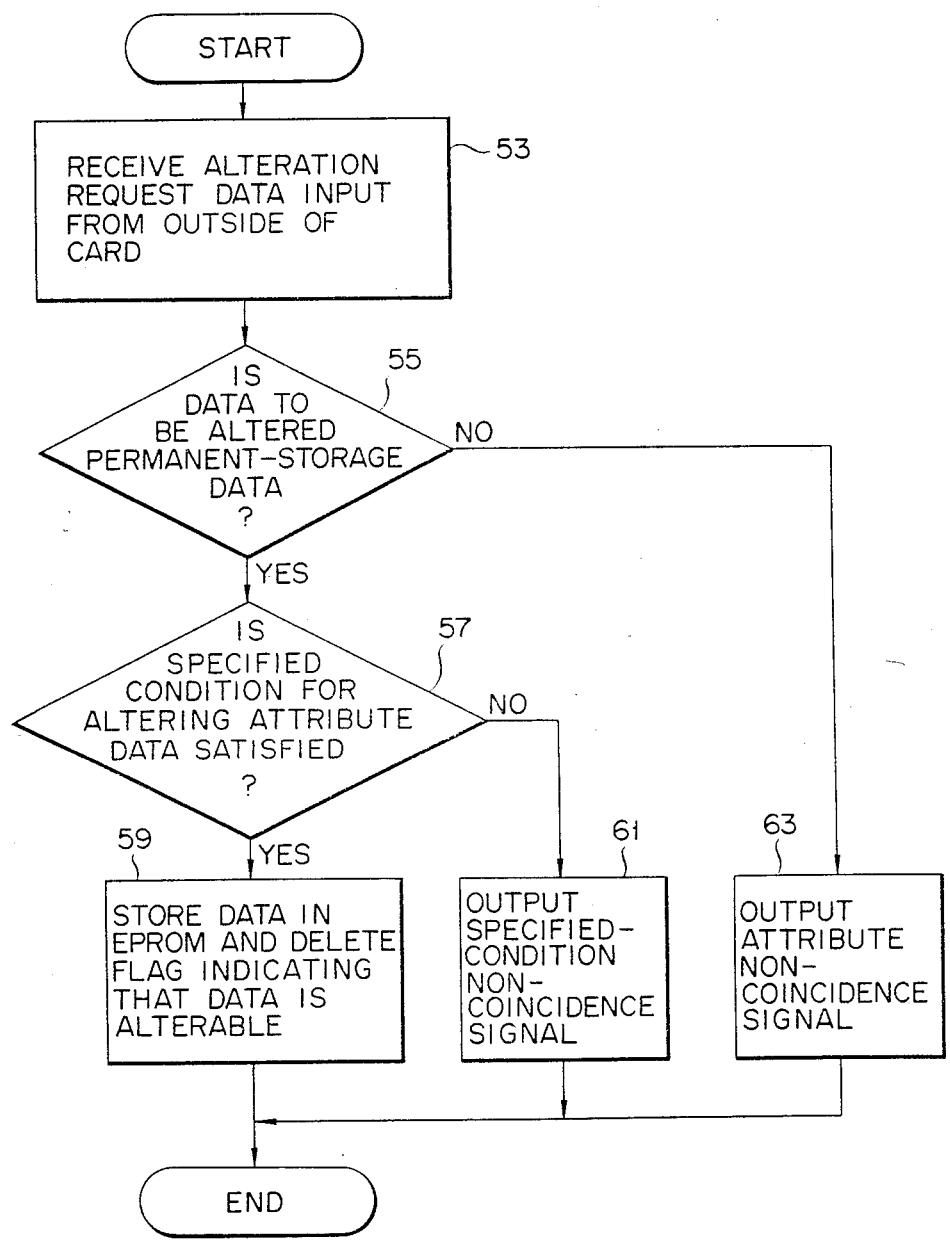
FIG. 10 is a flow chart for explaining the operation when data stored in a deletable memory is stored permanently.

Permanent data storage of temporal storage data stored in deletable EEPROM 4a will now be described with reference to the flow chart shown in FIG. 10. More specifically, CPU 11 of manipulator 10 supplies the address at which temporal data is stored, the address at which data is to be permanently stored, and a specified condition for altering an attribute to CPU 3 (step 53). CPU 3 determines, from whether or not the flag is set in area e in attribute data b added to the temporal storage data specified by the received address, if the data can be permanently held (step 55). If YES is determined in step 55, CPU 3 checks if the specified condition for altering the attribute data coincides with altering a specified condition in area f in attribute data b added to the storage data at the received address (step 57). If YES is determined in step 57, the storage data is stored in non-deletable EPROM 4b in accordance with the address at which the data is permanently held, and a flag in area e in attribute data b indicating that data is alterable for permanent storage is deleted so that the data cannot be altered (step 59). However, if NO is determined in step 57, an attribute non-coincidence signal is supplied to CPU 11 (step 61). If NO is determined in step 55, a specified-condition non-coincidence signal is supplied to CPU 11 (step 63).

Figure 11:
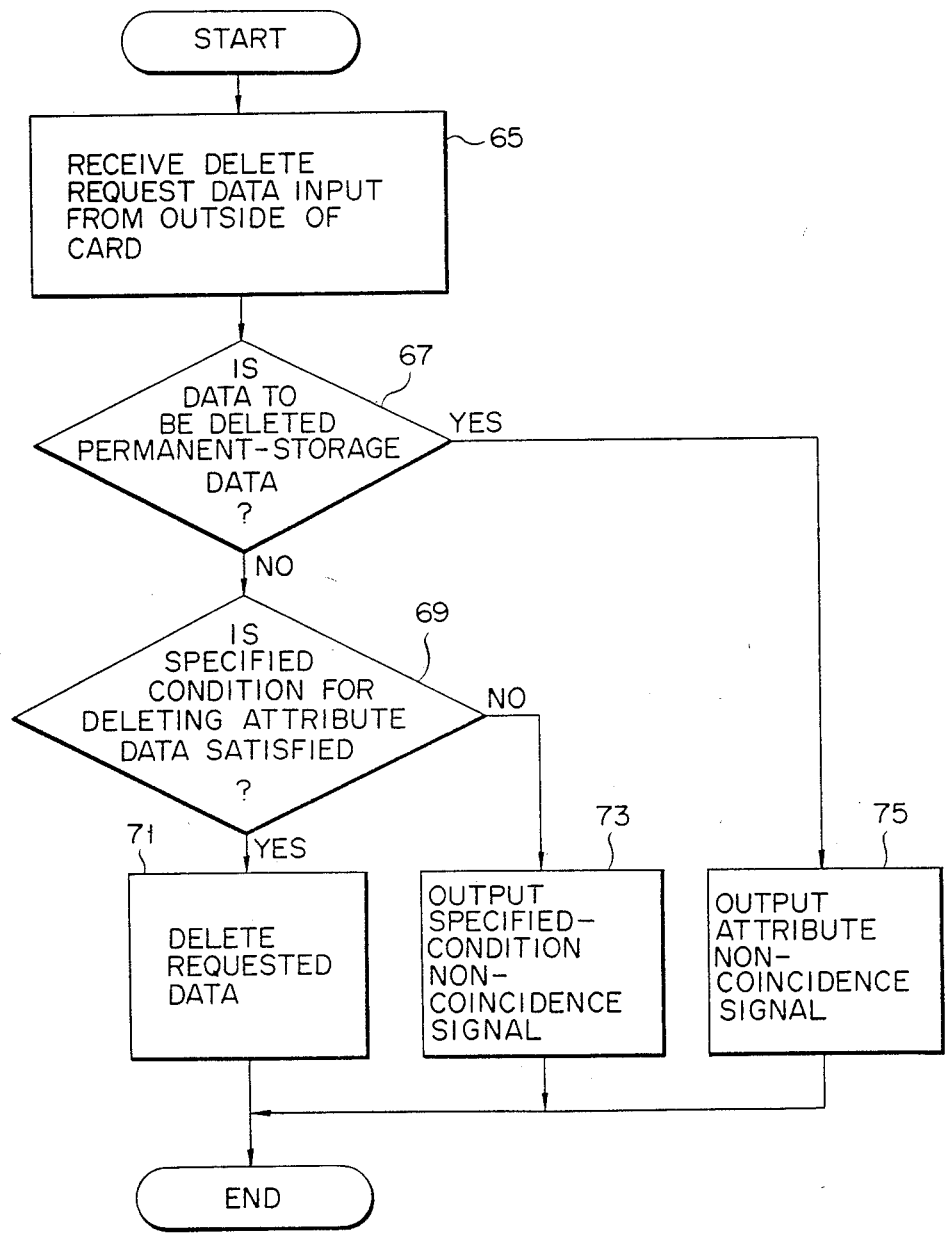
FIG. 11 is a flow chart for explaining the operation when data stored in a deletable memory is deleted.

The delete operation of temporal storage data stored in deletable EEPROM 4a will be described with reference to the flow chart shown in FIG. 11. More specifically, CPU 11 of manipulator 10 supplies an address at which data to be deleted is stored along with a specified condition for deleting data to CPU 3 (step 65). CPU 3 then judges, from whether or not the flag is set in area e in attribute data b added to the storage data at the received address, if the data is permanent storage data (step 67). If NO is determined in step 67, CPU 3 checks if the received specified condition for deleting data coincides with that in area f in attribute data b added to the storage data to be deleted (step 69). If YES is determined in step 69, i.e., a coincidence is found therebetween, the storage data is deleted (step 71). If NO is determined in step 69, an attribute non-coincidence signal is supplied to CPU 11 (step 73). If NO is determined in step 67, a specified-condition non-coincidence signal is supplied to CPU 11 (step 75).

As described above, data to be permanently stored is stored in the non-deletable EPROM, and data to be temporarily stored is stored in deletable EEPROM. If data having permanent storage possibility among the temporal storage data is stored in the EEPROM, it is normally non-deletable. However, as described above, when such data is re-stored in the EPROM, data stored in the EEPROM has an attribute indicating that permanent storage is unnecessary.

When temporal storage data having permanent storage possibility does not require permanent storage, a data bit indicating that the data can be altered so as to be permanent storage data can be altered in its attribute data. In this case, even if the data is not re-stored in the EPROM, it can have an attribute indicating that permanent storage is unnecessary. This alteration can be made only when the data is to be deleted and only when the specified condition for deleting data included therein is satisfied.

Figure 12:
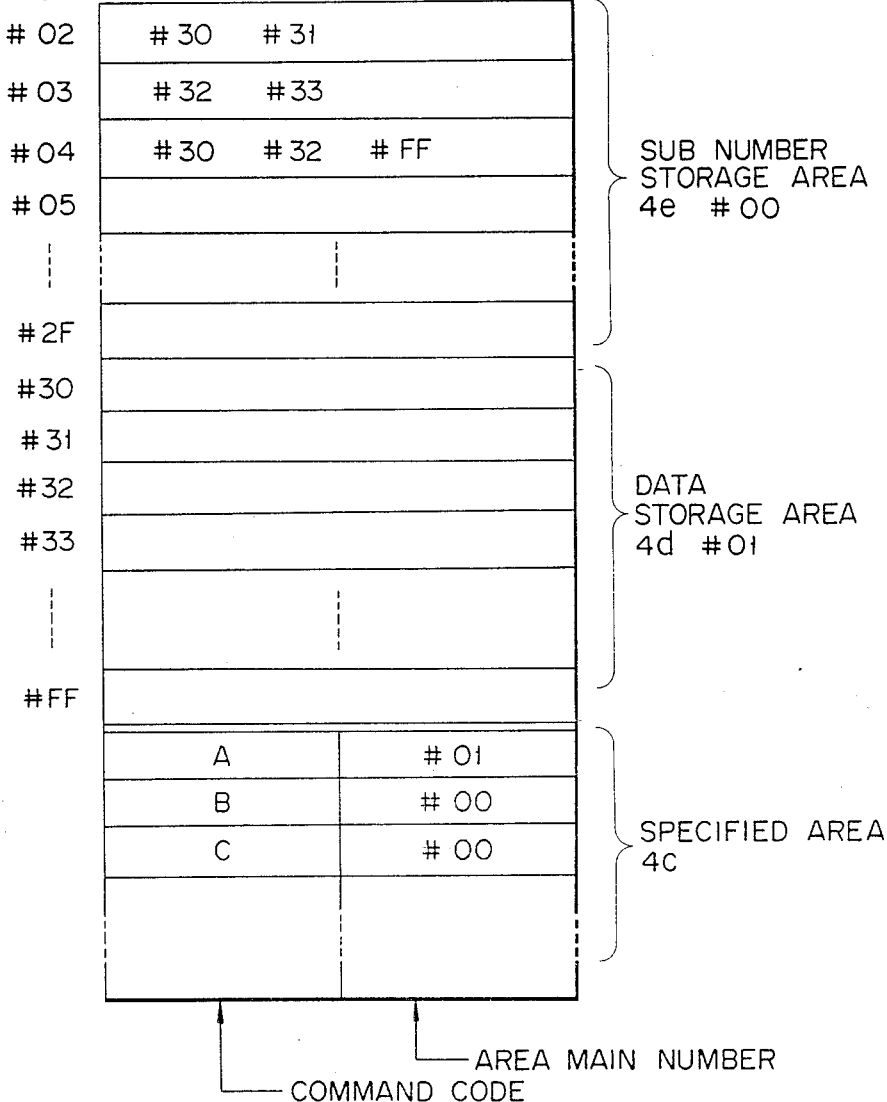
FIG. 12 is a memory format of the portable electronic device according to a second embodiment of the present invention.

A second embodiment of the present invention will be described hereinafter with reference to FIGS. 12 through 14. In this embodiment, data memory 4 comprises specified area 4c, data storage area 4d, and sub number storage area 4e. Specified area 4c is an access control data area and stores peculiar (command) codes of input data and area main numbers for selecting storage areas 4d and 4e in correspondence with each other. For example, area main number "#01" is stored in correspondence with command A, area main number "#00" is stored in correspondence with command B, and area main number "#00" is stored in correspondence with command C. Note that area main number "#00" indicates storage area 4e, and area main number "#01" indicates storage area 4d. Data storage area 4d is an area for storing data, e.g., in 208 sub areas specified by sub numbers "#30" through "#FF". Sub number storage area 4e is an area for storing sub areas in area 4d which can be accessed, and stores at least one sub number (area access control data) in each of 46 areas specified by sub numbers "#02" through "#2F".

When CPU 3 receives command B and sub number "#02" as control data, it reads out area main number "#00" from specified area 4c of data memory 4, and reads out sub numbers "#30" and "#31" from an area of sub number "#02" corresponding to area main number "#00", so as to access readout sub numbers "#30" and "#31" in storage area 4e. In addition, when CPU 3 receives command A and sub number "#2F" as control data, it reads out area main number "#01" from specified area 4c of data memory 4, and accesses sub number "#2F" in storage area 4d corresponding to number "#01". Also, when CPU 3 reads out area main number "#01" or "#00", it can recognize whether one or a plurality of areas are to be accessed. For example, when the area main number is "#00", a plurality of areas are to be accessed, and when the area main number is "#01", one area is to be accessed.

Figure 13:
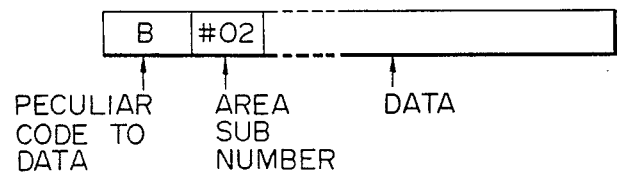
FIG. 13 is an example of a format of input data of the second embodiment.
Figure 14:
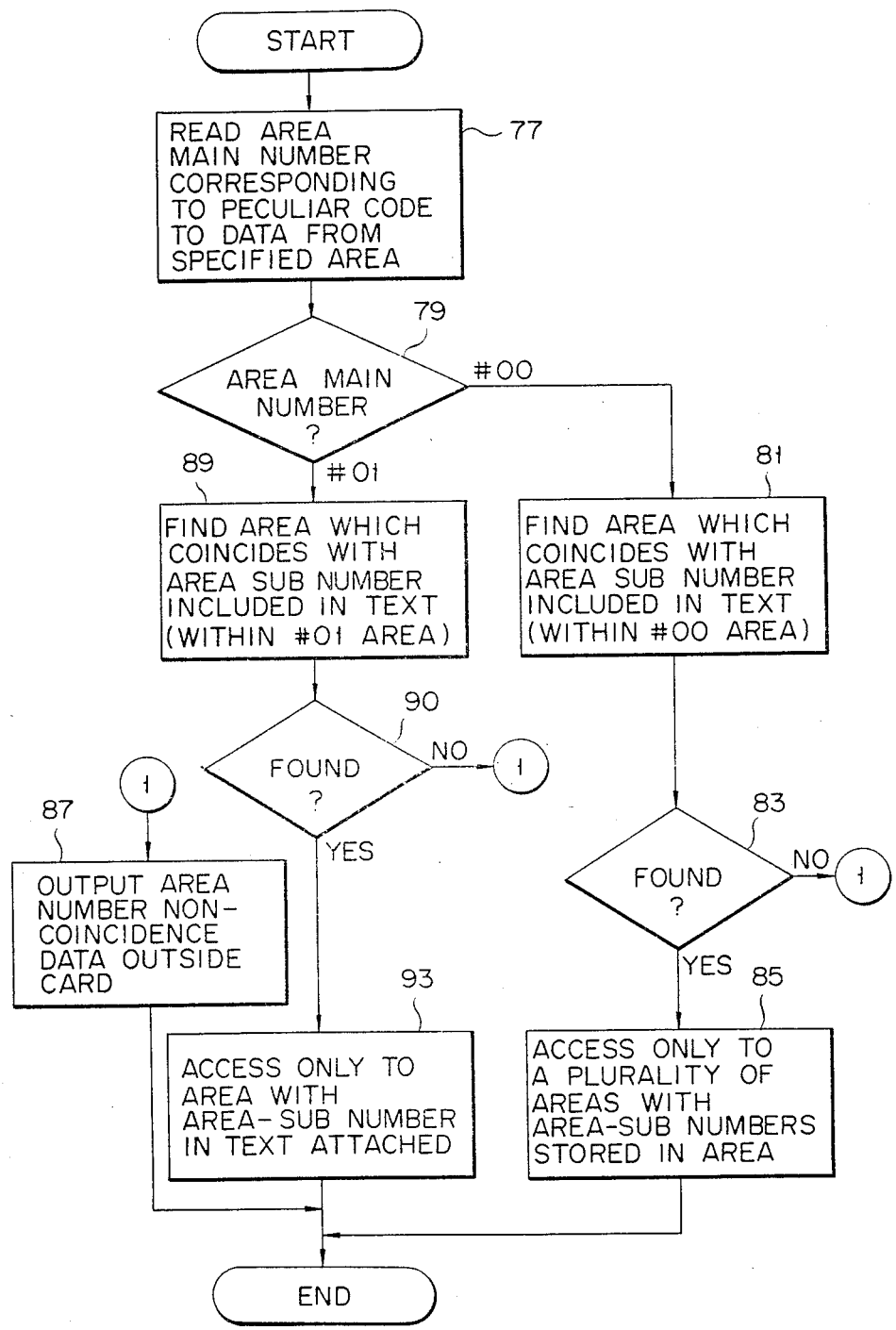
FIG. 14 is a flow chart for explaining the operation of the second embodiment.

Input data supplied from CPU 11 to CPU 3 in card 1 has a format as shown in FIG. 13. More specifically, the input data consists of a peculiar code (command code) to data, an area sub number as an access target, and a data string to be accessed. The code and the area sub number constitute control data.

With the above arrangement, the operation of the IC card will now be described with reference to the flow chart shown in FIG. 14. Assume that an operator (manipulator) sets an IC card manipulation mode using keyboard 12 of manipulator 10 and inserts card 1 in card insertion port 21. Card 1 is electrically connected to reader/writer 34 through connector section 2.

CPU 11 then supplies input data (command data) and a signal indicating the manipulator to CPU 3 through reader/writer 34, connector section 2, and interface circuit 5 shown in FIG. 8. CPU 3 reads out an area main number ("#00") corresponding to code (B) in the input data from specified area 4c (step 77), and determines that an area to be accessed is sub number storage area 4e (step 79). From this determination, CPU 3 also recognizes that a plurality of areas are to be accessed. CPU 3 searches a sub number in sub number storage area 4e which coincides with area sub number ("#02") of the input data (step 81). If a sub number having a coincidence is found, a plurality of sub numbers ("#30" and "#31") stored in the area are read out, and data access is made with reference to sub numbers "#30" and "#31" (steps 83 and 85). If the corresponding sub number is not found in step 83, CPU 3 outputs an area number non-coincidence signal to CPU 11 (step 87).

CPU 3 reads also out area main number "#01" corresponding to code (A) in the input data from specified area 4c, and judges that an area to be accessed is data storage area 4d (step 79). From this judgment, CPU 3 also recognizes that a single area is to be accessed as an access target of the input data. CPU 3 then searches a sub number in data storage area 4d which coincides with area sub number ("#2F") in the input data (step 89). If a sub number having a coincidence is found, data access is made with reference to the area (steps 90 and 93). At this time, if no corresponding sub number is found (step 90), CPU 3 outputs an area number non-coincidence signal to CPU 11 (step 87). When CPU 11 receives the area number non-coincidence signal, it signals this to the operator through CRT display unit 13.

As described above, regardless of whether a single area or a plurality of areas are to be accessed, when data is input to CPU 3 in card 1, the data is recognized as if it were accessed with reference to a single area. Therefore, input data processing is simplified. In addition, during data access the external device need not recognize the data memory format of the IC card, thus improving security of the IC card. When data for recognizing an area to be accessed is altered or added, any combination of areas requested by input data as an access target can be easily processed, and the above-mentioned security can be maintained.

Figures 15, 16:
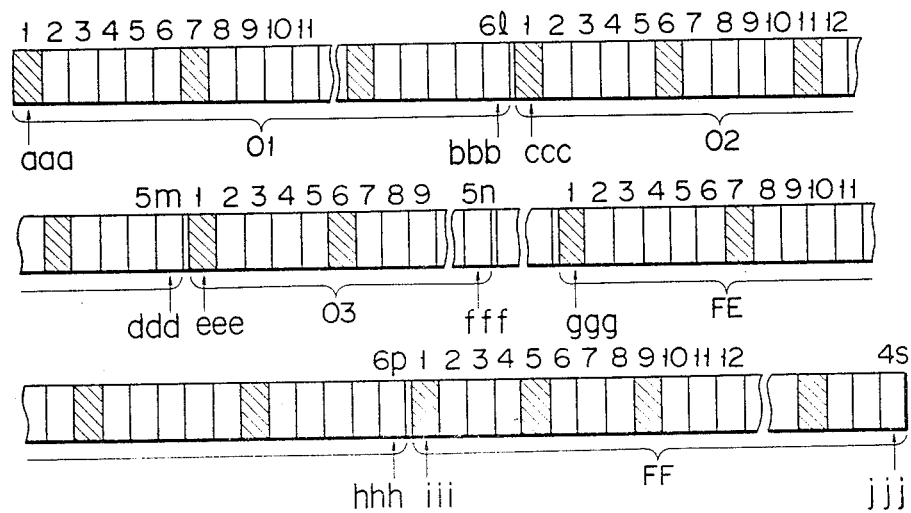
FIG. 15 is a memory format divided into a plurality of areas according to a third embodiment of the present invention.
FIG. 16 is a correspondence table of an area number, the number of bytes, a start address, and a final address for each area.

A third embodiment of the present invention will be described with reference to FIGS. 15 through 21B. In this embodiment, EPROM 4b is divided into a plurality of areas, as shown in FIG. 15, and these areas are assigned with area numbers [00] through [FF], respectively. Area [00] stores the numbers of bytes of the respective processing units, start addresses, and final addresses of areas [01] through [FF] in correspondence with the respective area numbers. For example, area [01] has 5 bytes, a start address is aaa, and a final address is bbb, as shown in FIG. 16. The number of bytes constituting each area is an integer multiple of the number of bytes obtained by adding the attribute data (1 byte) to the number of bytes as the processing unit. For example, since the number of bytes as the processing unit of area [01] corresponds to 5 bytes, the total number of bytes constituting area [01] is an l (integer) multiple of 6 bytes. Note that hatched portions in FIG. 15 indicate attribute data corresponding to the processing units.

Figure 17:
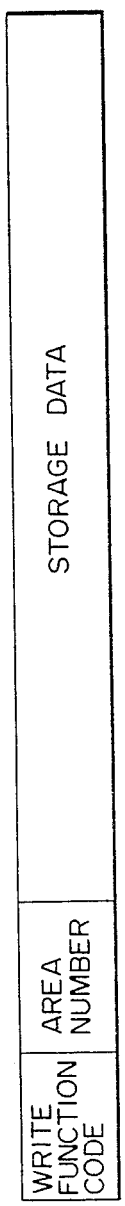
FIG. 17 is an example of a format of write instruction used in the third embodiment.
Figure 21A:
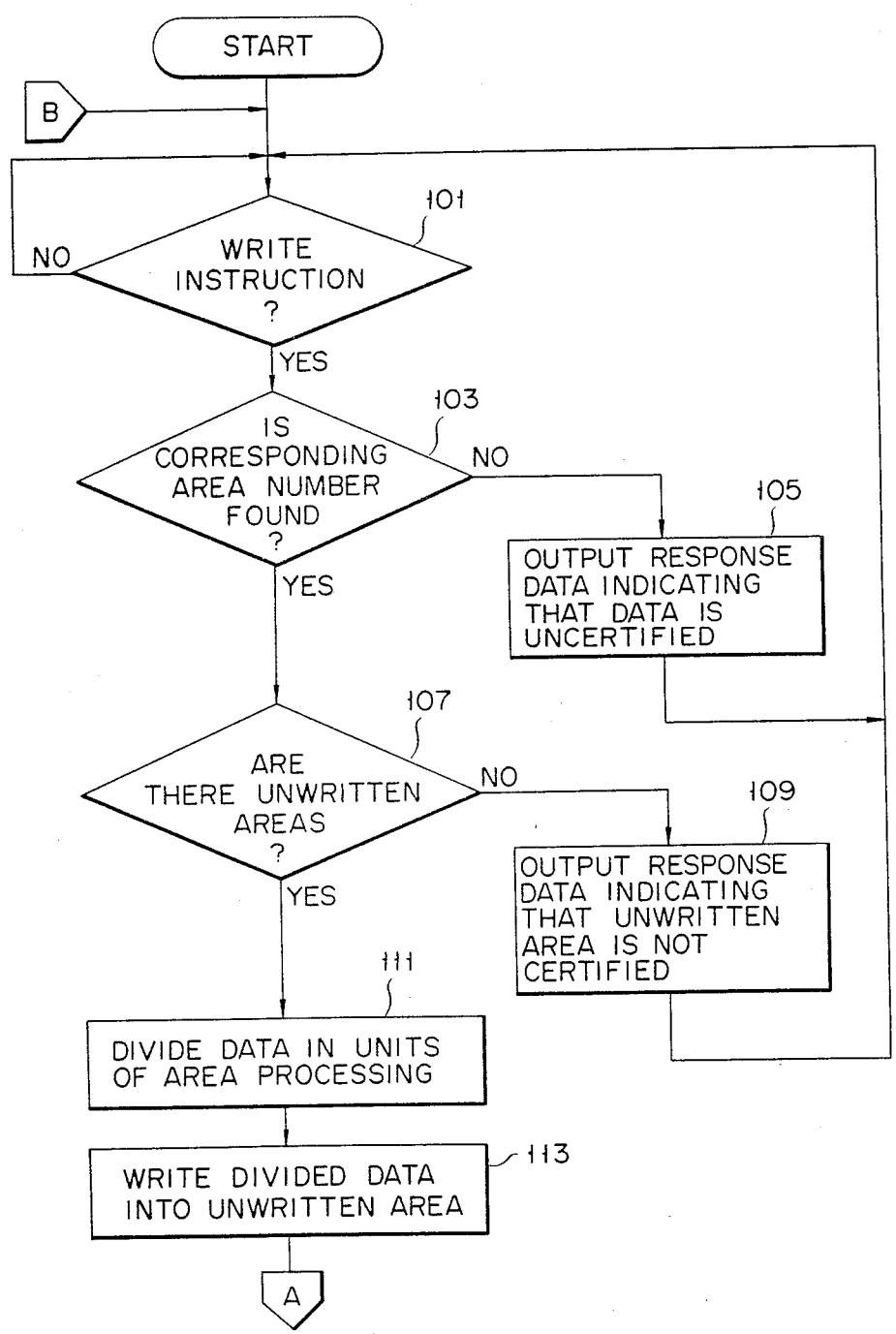
FIGS. 21A and 21B are flow charts for explaining a data write operation to the portable electronic device of the present invention.
Figure 21B:
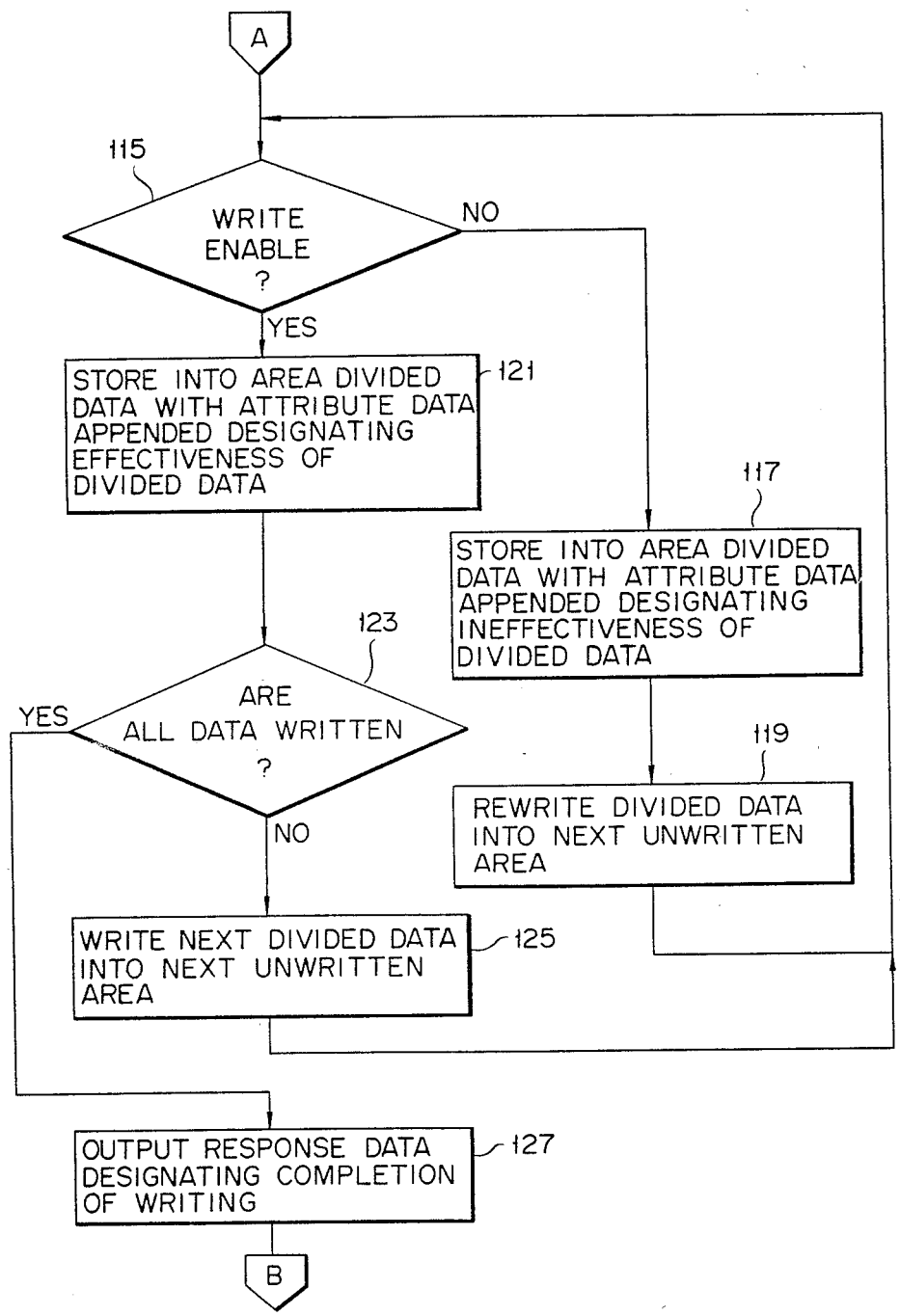

A data write operation of IC card 1 with the above arrangement will now be described with reference to the flow charts shown in FIGS. 21A and 21B. When data is written in IC card 1, write instruction data having a format shown in FIG. 17 is input. As shown, the write instruction data consists of a write function code, an area number, and storage data. In a normal state, CPU 3 awaits the write instruction data from reader/writer section 20. In this case, when the write instruction data is received from section 20, CPU 3 checks in step 101 if a function code included in the instruction data a write instruction. If YES is determined in step 101, CPU 3 searches an area number added to the instruction data from area [00] of EPROM 4b (step 103). If NO is determined in step 103, CPU 3 outputs response data indicating that data is uncertified and awaits the next write instruction in step 105. If YES is determined in step 103, CPU 3 checks in step 107 if there are unwritten areas. If NO is determined in step 107, CPU 3 outputs response data indicating that an unwritten area is not certified (step 109), and the flow returns to step 101. If YES is determined in step 107, CPU 3 divides the data with the number of units of the processing data and writes the divided data with its attribute data in step 113. It is then checked in step 115 if the written data is appropriately written. If NO is determined in step 115, CPU 3 rewrites the divided data with its attribute data appended designating ineffectiveness of the divided data at a location at which the data is stored, in steps 117 and 119, and the flow returns to step 115. If YES is determined in step 115, CPU 3 writes the divided data with attribute data appended designating effectiveness of the divided data, and writes them in their original areas, in step 121. CPU 3 checks in step 123 if all the data is written. If NO is determined in step 123, CPU 3 writes the next divided data in the next unwritten area in step 125, the flow then returns to step 115, and the above operation is repeated. However, if YES is determined in step 123, CPU 3 outputs response data indicating completion of writing to CPU 11 (step 127).

Figure 18:
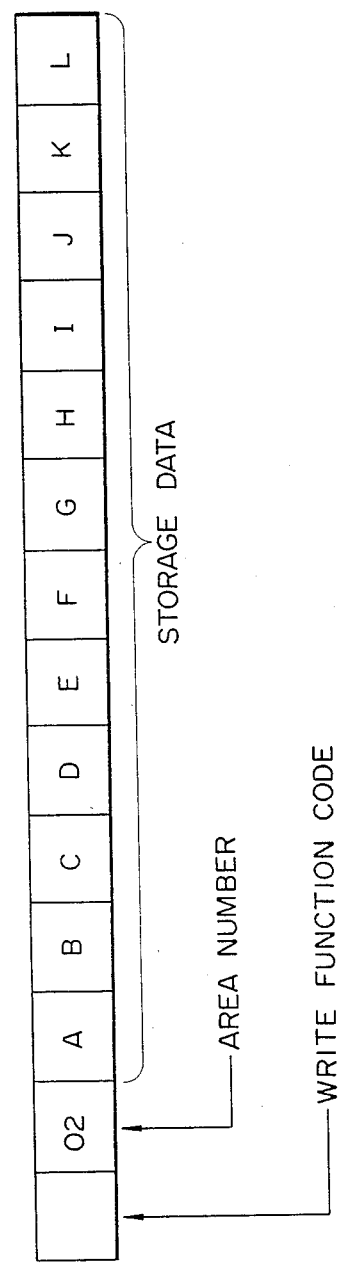
FIG. 18 is a detailed format of the write instruction.
Figure 19:
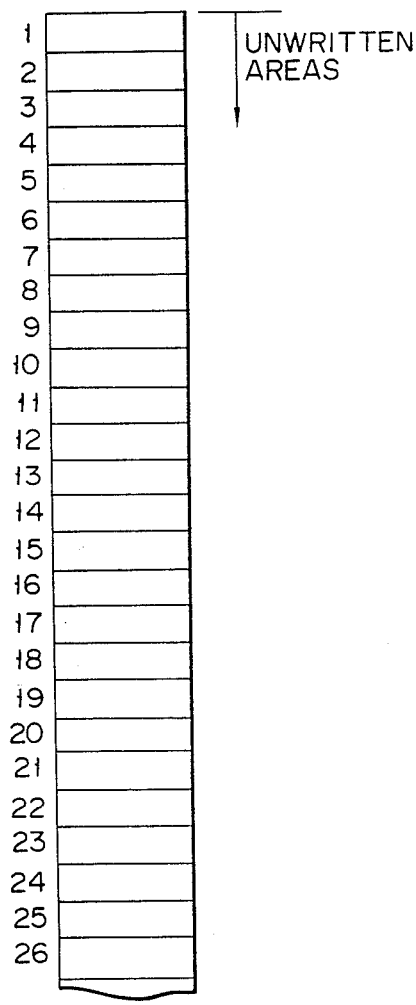
FIG. 19 is a representation showing a state before data is stored in an area.
Figure 20:
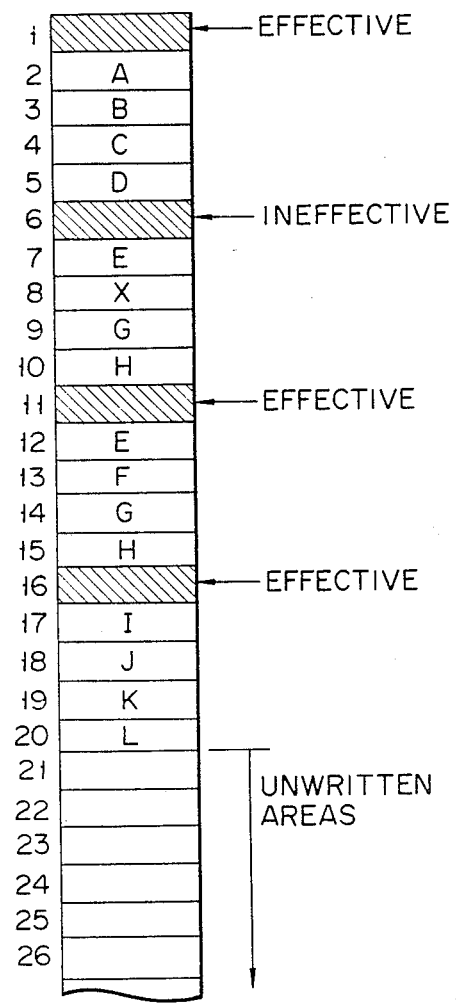
FIG. 20 is a representation showing a state after data is stored in an area.

Assume that write instruction data shown in FIG. 18 is input. In this case, since an area to be accessed is [02], the number of bytes as a processing unit corresponds to 4 bytes. Storage data included in the instruction data is stored in area [02] shown in FIG. 19. If an 8th byte is not normally written, the storage result is as shown in FIG. 20. Referring to FIG. 20, hatched portions at 1st, 6th, 11th, and 16th bytes are attribute data. In this case, the attribute data at the 6th byte indicates ineffectiveness, and other three attribute data indicate effectiveness.

With the arrangement as described above, when data is written in the data memory, since the number of bytes (bits) as a processing unit for each area is predetermined, attribute data attached thereto can be easily searched. When a large amount of data is written, if a write error occurs, effectiveness of data can be added for each byte. Therefore, part of the large amount of data need only be rewritten, and the memory area of the data memory can be effectively used.

Figure 22:
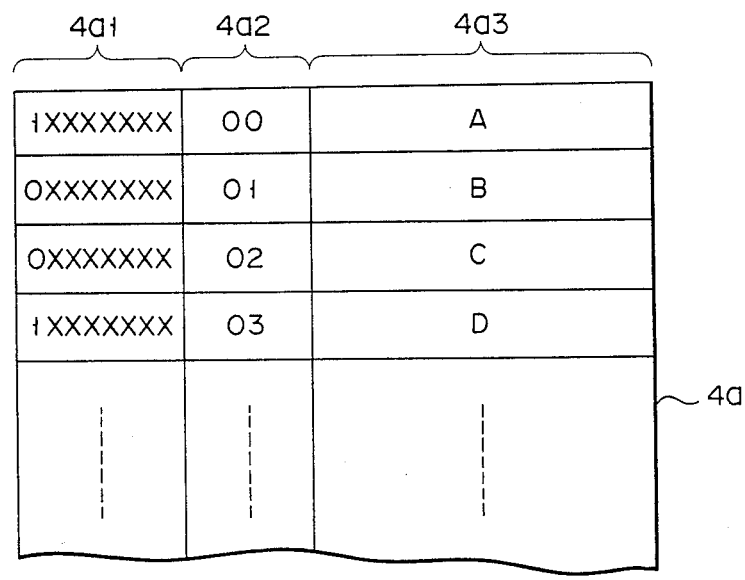
FIG. 22 is a representation showing a storage state of specified data in a data memory according to a fourth embodiment of the present invention.
Figure 23:
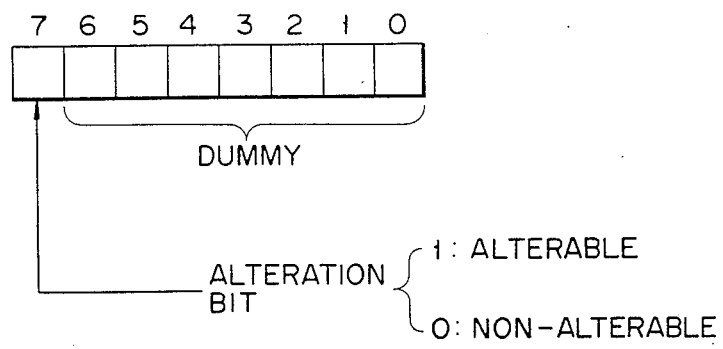
FIG. 23 is a format of identification data shown in FIG. 22.

A fourth embodiment of the present invention will be described with reference to FIGS. 22 through 30. EEPROM 4a comprises specified data storage area 4a1 for storing specified data, e.g., PIN data, valid date data, or the like, index data storage area 4a2 for storing index data unique to each specified data, and attribute data storage area 4a3 for storing attribute data indicating whether or not each specified data is alterable, as shown in FIG. 22. More specifically, each specified data consists of identification data indicating whether the specified data is alterable or non-alterable, and index data unique to each specified data. The identification data consists of 1 byte and has an 8-bit configuration, as shown in FIG. 23. If the 7th bit is "1", the corresponding specified data is alterable, and if it is "0", the data is non-alterable. Note that the zero through 6th bits are dummy bits. A predetermined area of EEPROM 4a stores a specified personal identification number used for altering the specified data.

Figure 27:
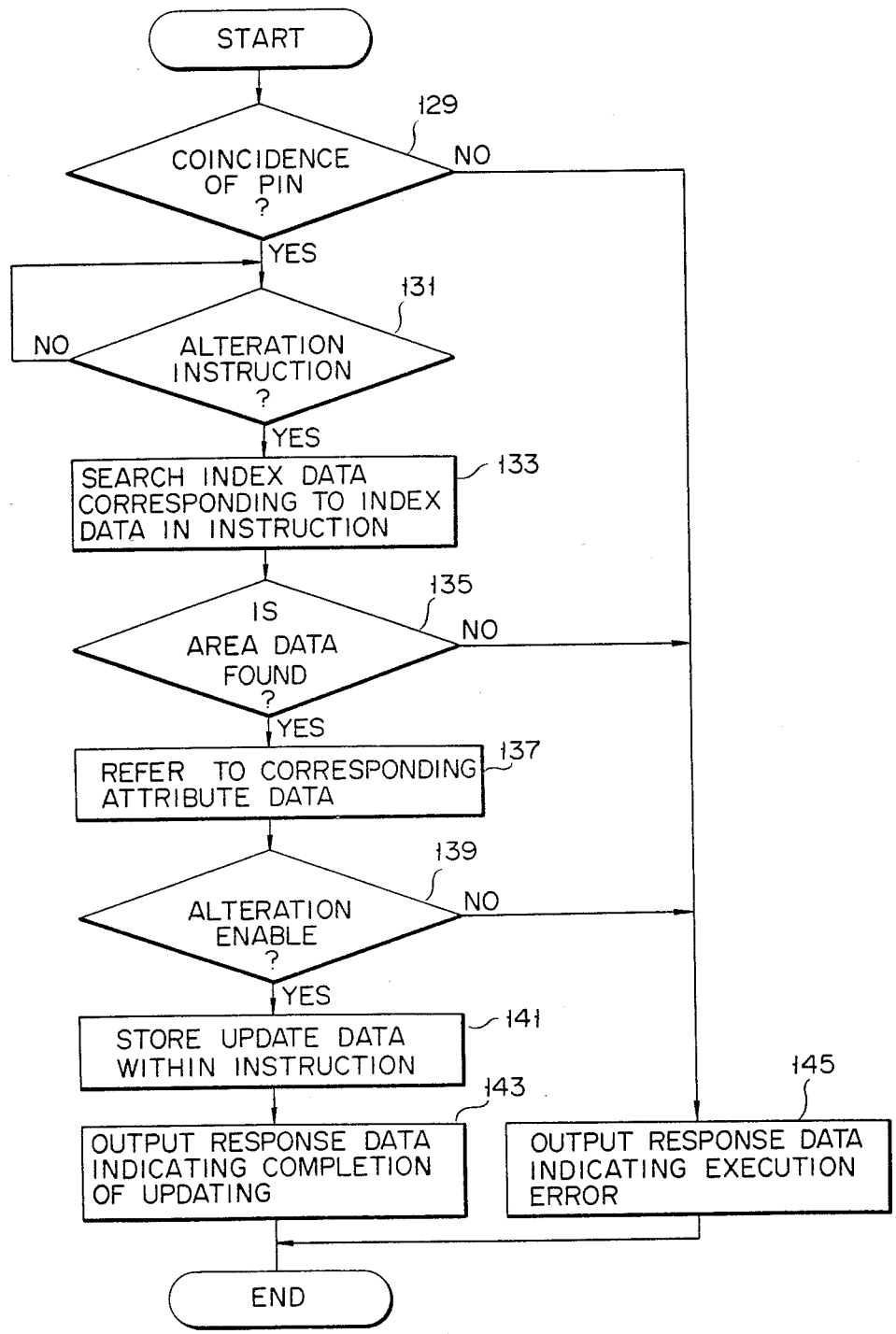
FIG. 27 is a flow chart for explaining the operation when specified data is altered.

With this arrangement, the operation for altering specified data stored in EEPROM 4a will be described with reference to the flow chart shown in FIG. 27. First, specified personal identification numbers (PIN) are compared. More specifically, when a specified PIN is input by keyboard 12, it is input to card 1 through reader/writer section 20. In IC card 1, CPU 3 compares the PIN data input with PIN data stored in a predetermined area of EEPROM 4a, in step 129. If no coincidence is found therebetween, i.e., if NO is determined in step 129, CPU 3 outputs response data indicating an execution error to an external device, in step 145. However, if YES is determined in step 129, CPU 3 awaits alteration instruction data. Alteration instruction data consists of an altering instruction code, area data, and alteration data, as shown in FIG. 24. In data acceptable state, if it is determined in step 131 that altering instruction data is input through reader/writer section 20, CPU 3 seaches area data which coincides with that included in the instruction data from EEPROM 4a, in step 133. If no such area data is found in step 135, CPU 3 outputs response data indicating an execution error to the external device in step 145. However, if YES is determined in step 135, CPU 3 refers to identification data corresponding to the area data in step 137 to check in step 139 if the corresponding specified data is alterable. If YES is determined in step 139, CPU 3 stores the alteration data included in the instruction data, in step 141, and outputs response data indicating completion of alteration to the external device, in step 143. However, if NO is determined in step 139, CPU 3 outputs response data indicating an execution error to the external device, in step 145.

If the input altering instruction data is data as shown in FIG. 25A, since area data is "00", the 7th bit of the identification data corresponding to area data "00" in FIG. 22 is referred to. In this case, since the 7th bit is "1", it is determined that specified data corresponding to area data "00" can be altered, and alteration data X shown in FIG. 25A is newly stored. Thus, the content of EEPROM 4a becomes as shown in FIG. 26.

If the input altering instruction data is data as shown in FIG. 25B, since area data is "02", the 7th bit in identification data corresponding to area data "02" in FIG. 22 is referred to. In this case, since the 7th bit is "0", it is determined that specified data corresponding to area data "02" is non-alterable, and the specified data is not altered.

A specified PIN to be compared during alteration can be alterable. In this case, security of the IC card can be further enhanced.

With the arrangement described above, PIN data, valid date data, or the like stored in the data memory can be altered as needed. Therefore, if a PIN is known to a third party and security is lost, it can be altered to recover the security. When stored valid date data can be altered, if the valid date of an IC card corresponds to its service life, the service life can be sequentially updated, and the IC card can be effectively used.

Figure 28A:
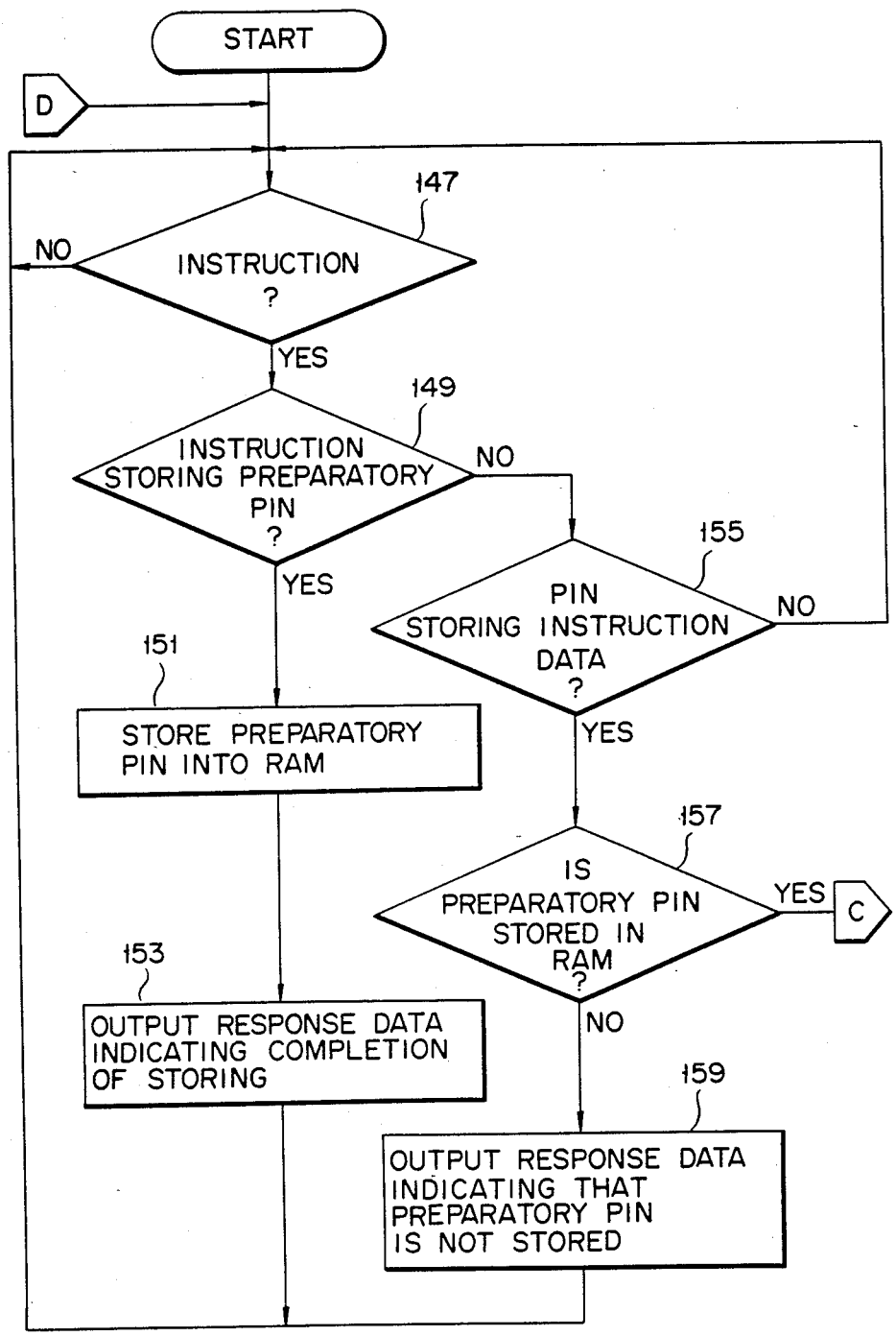
FIGS. 28A and 28B are flow charts for explaining the operation when a personal identification number is stored.
Figure 28B:
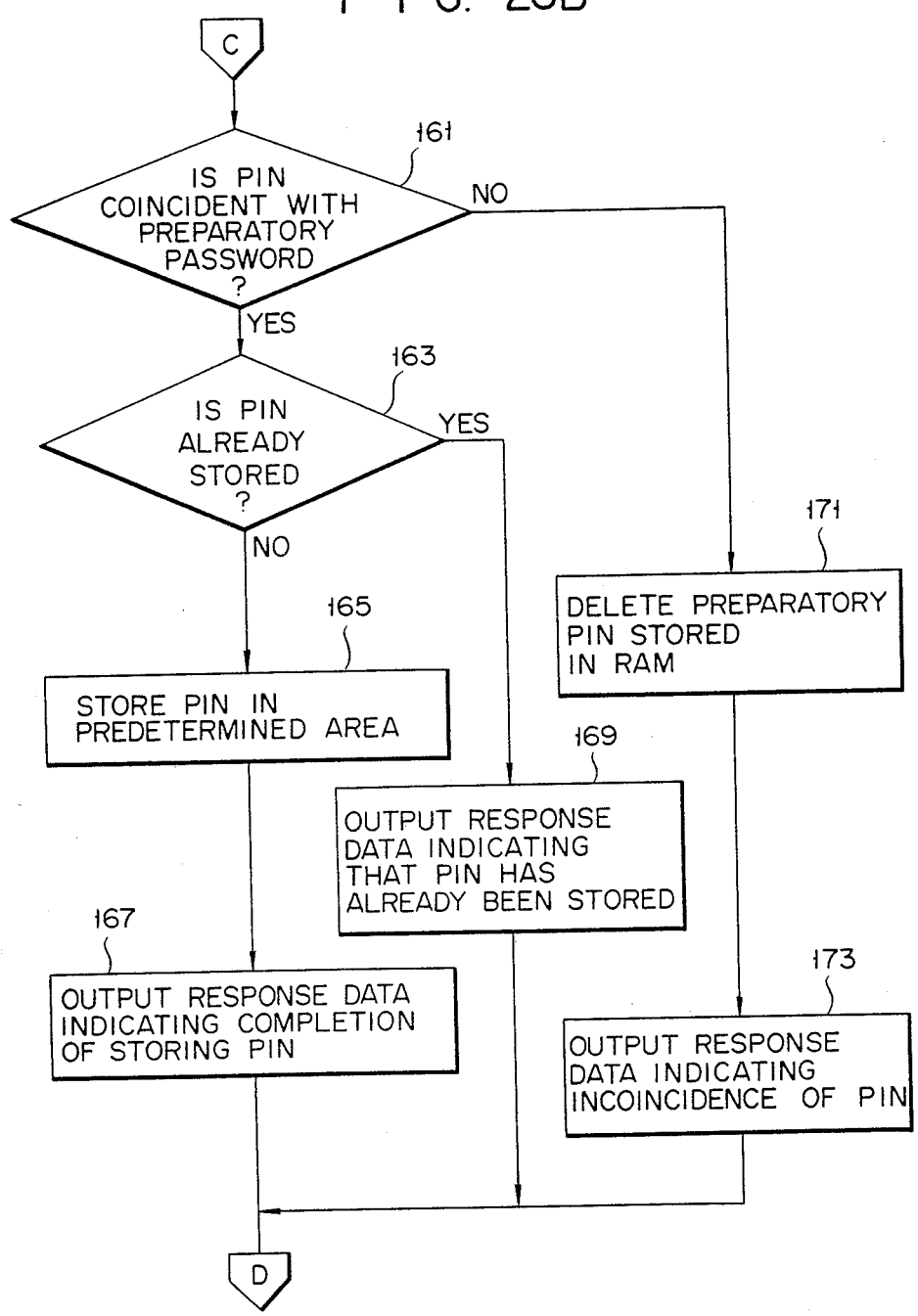

A method for storing specified data, e.g., PIN data, in EEPROM 4a according to another embodiment of the present invention will be described hereinafter with reference to the flow charts shown in FIGS. 28A and 28B. As shown, IC card 1 awaits instruction data from card reader/writer section 20 in step 147. When PIN preparatory storage instruction data consisting of a PIN preparatory storage function code and a PIN preparatory number, as shown in FIG. 29, are input in step 149, CPU 3 detects the PIN preparatory storage function code in the instruction data. If NO is determined in step 149, the flow advances to step 155. However, if YES is determined in step 149, CPU 3 temporarily stores the PIN preparatory number added to the instruction data in its internal RAM, in step 151, outputs response data indicating completion of storage in step 153, and then awaits the next instruction data. At this time, if it is determined in steps 147 and 149 that another PIN preparatory storage instruction data is input, CPU 3 similarly stores a new PIN preparatory number included in the instruction data in its RAM in step 151, outputs the response data indicating completion of storage in step 153, and then awaits the next instruction data.

Assume that in the instruction data awaiting state, PIN storage function code consisting of a PIN storage function code and a PIN, as shown in FIG. 30, is input. CPU 3 detects the PIN storage function code as instruction data in step 155. If NO is determined in step 155, CPU 3 awaits the next instruction data. If YES is determined in step 155, CPU 3 checks in step 157 if the PIN preparatory number is stored in its RAM. If NO is determined in step 157, CPU 3 outputs response data indicating that the PIN preparatory number is not stored, in step 159, and then awaits the next instruction data. If YES is determined in step 157, CPU 3 compares the PIN included in the instruction data with the PIN preparatory number stored in its RAM, in step 161. If YES is determined in step 161, CPU 3 checks in step 163 if another PIN has already been stored in a predetermined area of EEPROM 4a in which the PIN is to be stored. If YES is determined in step 163, CPU 3 outputs response data indicating that the PIN has already been stored, in step 169, and then awaits the next instruction data. If NO is determined in step 163, CPU 3 stores the compared PIN in the predetermined area in step 165, outputs response data indicating completion of storage in step 167, and then awaits the next instruction data. If NO is determined in step 161, CPU 3 deletes the PIN preparatory number stored in its RAM, in step 171, outputs response data indicating data non-coincidence in step 173, and then awaits the next instruction data.

When PIN data is stored in the data memory, the PIN data is input from the keyboard twice or more, and the input data are compared in the IC card to store them only when a coincidence therebetween is found. Thus, storage of an undesirable PIN due to an operator error can be satisfactorily prevented.

In the above embodiment, when PIN data is stored, if PIN preparatory storage instruction data and PIN storage instruction data are input in this order, they can be stored. However, the present invention is not limited to such a two-step input method. For example, PIN data can be stored through a plurality of times of instruction data inputs.

Figures 31, 32:
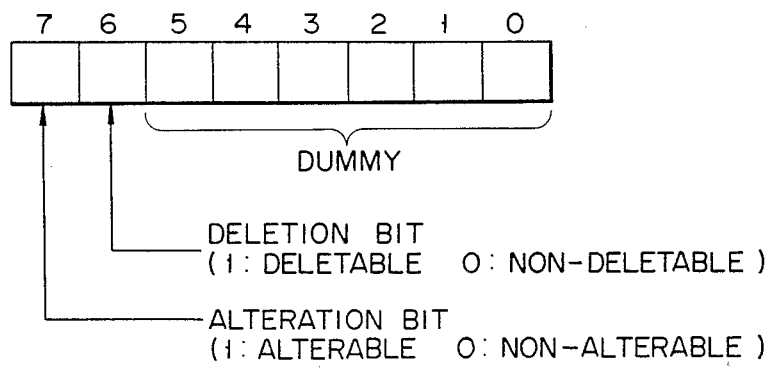
FIG. 31 is a format of a data memory according to a fifth embodiment of the present invention.
FIG. 32 is a bit format of access data shown in FIG. 31.

FIGS. 31 through 33 show a fifth embodiment of the present invention.

In this embodiment, in EEPROM 4a shown in FIG. 31, an identifier indicating whether or not data is deletable is provided as access data, in addition to an identifier indicating whether or not data is alterable.

More specifically, referring to FIG. 32, the 7th bit is an identifier indicating whether or not data is alterable. If the 7th bit is "1", the data is alterable, and if it is "0", the data is non-alterable. The 6th bit is an identifier indicating whether or not data is deletable. If the 6th bit is "1", the data is deletable, and if it is "0", the data is non-deletable. The zero through 5th bits are dummy bits.

As shown in FIG. 31, in the areas of area data [00] and [01], data is non-alterable and non-deletable. In the area of area data [02], data is alterable but non-deletable. In the areas of area data [03] and thereafter, data is alterable and deletable. Note that data in the area of area data [00] is stored when the IC card is manufactured.

A delete operation will now be described with reference to the flow chart shown in FIG. 33.

When instruction data is input from card reader/writer section 20, CPU 3 decodes a function code and, at the same time, checks if a function can be executed by data in the area of area data [00], thus outputting the result. If delete instruction data is input in step 175, CPU 3 decodes a function code in step 177 and, at the same time, refers to data in the area of area data [00] to check in step 179 if an area corresponding to the area data included in the instruction data can be deleted. If NO is determined in step 179, CPU 3 outputs response data indicating that deletion is disabled in step 185, and awaits the next instruction data. However, if YES is determined in step 179, CPU 3 deletes data in the corresponding area in step 181, outputs response data indicating completion of execution in step 183, and then awaits the next instruction data. Therefore, if instruction data for deleting data in the area of area data [01] is received, the response data indicating that deletion is disabled is output, and data stored in the area of area data [01] will not be deleted. Similarly, as for the area of area data [00], since the data stored therein will not be deleted, access conditions for the respective areas can be permanently maintained.

In this manner, the data memory is divided into a plurality of areas, specified data indicating that data stored is alterable or deletable is stored in a specified area in each area, and data stored in the specified area is inhibited from being altered and deleted. Alteration and deletion possibilities of data can be defined for each area, and the defined data can be permanently stored. Therefore, when data in the data memory is controlled in units of areas, data can be protected from being erroneously erased, and permanent storage data can be reliably protected, thus greatly improving reliability of the IC card system.

In the above embodiments, the data memory comprises an EEPROM. However, the present invention is not limited to this, and the data memory can comprise an EPROM or a RAM.

In the above embodiments, an IC card has been exemplified as a portable electronic device. The shape of the portable electronic device is not limited to a card-like shape, but can be a block-like shape or a pencil-like shape. The hardware arrangement of the portable electronic device can be modified within the spirit and scope of the present invention.

What is claimed is:

1. A portable electronic device detachably connected to a host system, comprising:
    first memory means, divided into a plurality of areas, for storing write data in each area;
    second memory means for storing, in accordance with the divided areas, a unit data length defining the length of data to be written in the respective divided areas of said first memory means;
    means for receiving write data supplied from said host system;
    means for dividing the received write data in accordance with the unit data length corresponding to the divided areas in which the received write data are to be stored;
    means for storing the divided data in said first memory means; and
    means for repetitively operating said dividing means and storing means until all of the divided received write data are stored in said first memory means.

2. The portable electronic device according to claim 1, wherein the unit data length stored in said second memory means is non-deletable.

3. The portable electronic device according to claim 1, wherein said second memory means further stores data which indicates whether the write data in said first memory means is deletable.

4. A portable electronic device detachably connected to a host system, comprising:
    first memory means, divided into a plurality of areas, for storing transaction data in each area;
    second memory means for storing data indicating whether the transaction data is deletable;
    means for receiving a command supplied from said host system;
    means for discriminating whether the received command is a delete command;
    means for deleting the transaction data stored in said first memory means in response to a delete command; and
    means for inhibiting said deleting means from deleting the transaction data if the data stored in said second memory means indicates that said transaction data is non-deletable.

5. The portable electronic device according to claim 4, wherein the data stored in said second memory means indicating whether the transaction data is deletable is non-deletable.

6. A portable electronic device detachably connected to a host system, comprising:
    first memory means, divided into a plurality of areas, for storing transaction data in each area;
    second memory means, divided into a plurality of areas which are each assigned identification data, for storing address data for addressing the plurality of divided areas in said first memory means;
    means for receiving a command code and the identification data from said host system; and
    means for accessing said second memory means, in response to the command code, to obtain the address data corresponding to the received identification data, and for accessing said first memory means so as to obtain the transaction data in accordance with the obtained address data.

* * * * *